United States Patent
Pursifull et al.

(10) Patent No.: US 12,319,097 B2
(45) Date of Patent: Jun. 3, 2025

(54) SYSTEM AND METHOD FOR MONITORING TIRE TREAD AND RECOMMENDING A TIRE ROTATION SERVICE

(71) Applicant: Ford Global Technologies, LLC, Dearborn, MI (US)

(72) Inventors: Ross Dykstra Pursifull, Dearborn, MI (US); Matthew Aaron Knych, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 17/900,181

(22) Filed: Aug. 31, 2022

(65) Prior Publication Data

US 2024/0066929 A1    Feb. 29, 2024

(51) Int. Cl.
  *B60C 11/24*    (2006.01)
  *B60C 23/04*    (2006.01)
  *G07C 5/00*    (2006.01)
  *G07C 5/08*    (2006.01)

(52) U.S. Cl.
  CPC .......... *B60C 11/246* (2013.01); *B60C 11/243* (2013.01); *B60C 23/0479* (2013.01); *B60C 23/0488* (2013.01); *G07C 5/006* (2013.01); *G07C 5/0825* (2013.01); *B60C 2200/04* (2013.01)

(58) Field of Classification Search
  CPC . B60C 11/246; B60C 11/243; B60C 23/0479; B60C 23/0488; B60C 2200/04; B60C 23/0408; G07C 5/006; G07C 5/0825

USPC .......................................................... 340/442
  See application file for complete search history.

(56) References Cited

U.S. PATENT DOCUMENTS

| | | | | |
|---|---|---|---|---|
| 6,002,327 A | * | 12/1999 | Boesch | B60C 23/061 701/30.6 |
| 7,868,749 B2 | * | 1/2011 | Miyamoto | B60C 23/061 340/447 |
| 9,376,118 B2 | * | 6/2016 | Benedict | G07C 5/008 |
| 9,719,886 B2 | | 8/2017 | Luk et al. | |
| 10,518,590 B2 | * | 12/2019 | Stewart | G01M 17/02 |

(Continued)

FOREIGN PATENT DOCUMENTS

JP    2009262817 A  *  11/2009
WO    2017149954 A1    9/2007

*Primary Examiner* — Eric Blount
(74) *Attorney, Agent, or Firm* — Burr & Forman LLP; Lorne Forsythe (57) ABSTRACT

A system for monitoring tire tread on a vehicle may include front wheels, rear wheels, a sensor network to determine rolling radius data associated with the front wheels and the rear wheels, processing circuitry which may include a memory unit and may be configured to receive the rolling radius data from the sensor network, and a user interface which may display information to an operator of the vehicle. The processing circuitry may be further configured to determine a rolling radius of the front wheels and the rear wheels, determine a difference in the rolling radius between the front wheels and the rear wheels, compare the difference in the rolling radius to a predetermined threshold value, and generate a notification via the user interface to indicate that a tire rotation may be recommended responsive to the difference in the rolling radius exceeding the predetermined threshold value.

20 Claims, 4 Drawing Sheets

(56) References Cited

U.S. PATENT DOCUMENTS

| | | | |
|---|---|---|---|
| 10,960,712 B2* | 3/2021 | Storti | B60W 40/12 |
| 11,945,264 B2* | 4/2024 | Okazaki | B60C 23/0415 |
| 2004/0207518 A1* | 10/2004 | Tamimi | B60C 23/061 |
| | | | 340/443 |
| 2020/0231010 A1* | 7/2020 | Carpenter | G07C 5/006 |
| 2021/0331530 A1 | 10/2021 | Senriuchi et al. | |

* cited by examiner

SYSTEM AND METHOD FOR MONITORING TIRE TREAD AND RECOMMENDING A TIRE ROTATION SERVICE

TECHNICAL FIELD

Example embodiments generally relate to vehicle maintenance tracking and, more particularly, relate to a system and method for detecting a need for a tire rotation.

BACKGROUND

Maintenance may be an integral aspect of vehicle ownership in order to maximize the longevity and functionality of a vehicle. Typical, scheduled maintenance recommendations are based on hours of use or miles driven as indicators of when certain maintenance tasks should be performed, further allowing for variance based on operating conditions.

In an effort to shift away from recommending scheduled maintenance based only on time or mileage, newer vehicles may be equipped with maintenance tracking systems that may monitor the status of various vehicle components in order to help the operator to perform vehicle maintenance on an as-needed basis that can consider each vehicle's unique operational context. The use dependent maintenance recommendation may be used to augment scheduled maintenance in some cases, and need not necessarily replace scheduled maintenance. One such vehicle component that may require frequent maintenance is the tires. A vehicle's tires may wear differently based on a number of factors, and therefore optimal replacement of the tires may not be accomplished using a scheduled maintenance approach that relies on mileage or time.

Thus, it may be desirable to develop a tire tread monitoring system that can be used to provide a notification to the vehicle operator when a tire rotation is recommended.

BRIEF SUMMARY OF SOME EXAMPLES

In accordance with an example embodiment, a system for monitoring tire tread on a vehicle may be provided. The system may include front wheels which may include front tires, rear wheels which may include rear tires, a sensor network which may be operably coupled to one or more of the front tires and one or more of the rear tires to determine rolling radius data associated with the front tires and the rear tires, processing circuitry which may include a memory unit and may be configured to receive the rolling radius data from the sensor network, and a user interface which may display information to an operator of the vehicle. The processing circuitry may be further configured to determine a rolling radius of the front tires and the rear tires based on the rolling radius data, determine a difference in the rolling radius between the front tires and the rear tires, compare the difference in the rolling radius to a predetermined threshold value, and generate a notification via the user interface to indicate that a tire rotation may be recommended responsive to the difference in the rolling radius exceeding the predetermined threshold value.

In another example embodiment, a method of monitoring tire tread on a vehicle may be provided. The method may include determining a rolling radius of front tires and rear tires of the vehicle based on rolling radius data, determining a difference in the rolling radius of the front tires and the rear tires, comparing the difference in the rolling radius to a predetermined threshold value, and generating a notification on a user interface to indicate that a tire rotation may be recommended responsive to the difference in the rolling radius exceeding the predetermined threshold value.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, maintenance may be performed on an as-needed basis, rather than a rigidly scheduled basis. As such, new vehicles are increasingly commonly equipped with maintenance monitoring systems. This approach to vehicle maintenance may lead to a better use of parts resources by not prematurely replacing parts on a vehicle that do not need to be replaced.

Many vehicles may wear down their tires in a predictable manner. In this regard, a front wheel drive vehicle may wear down the front tires faster than the rear, and a rear wheel drive vehicle may wear down the rear tires faster than the front. In order to promote tire longevity, routine tire maintenance may include performing a tire rotation to move the less worn tires to the positions that will wear down faster. For example, in a vehicle where the rear tires wear down faster than the front tires, the tires should be rotated from front to back. This saves the vehicle operator from having to buy new tires as often, and also puts all four tires in a cycle to need replacement at about the same time.

Some example embodiments described herein may address the problem described above. In this regard, for example, some example embodiments may provide for a system and method for monitoring tire tread on a vehicle and may recommend a tire rotation to the operator accordingly. As a result, the tires of the vehicle may last longer, the operator may save money on unnecessary new tires, and the vehicle may operate more efficiently overall.

Figure 1:
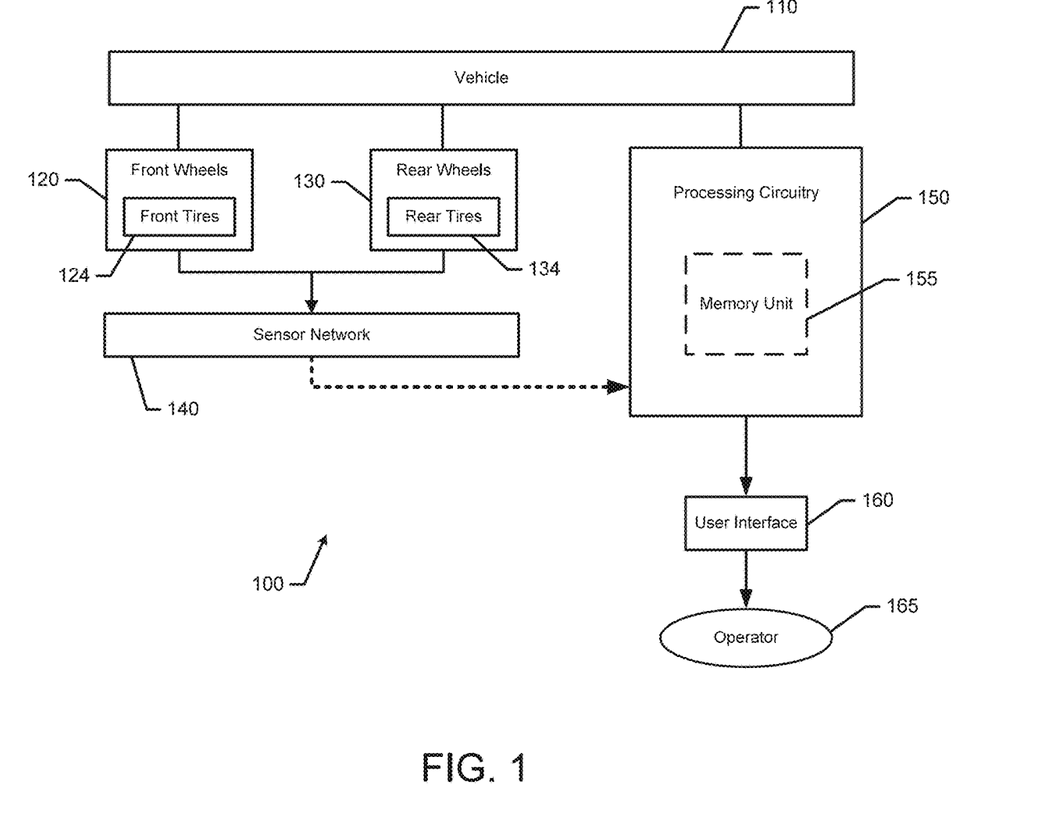
FIG. 1 illustrates a block diagram of a tire tread monitoring system in accordance with an example embodiment.
Figure 2:
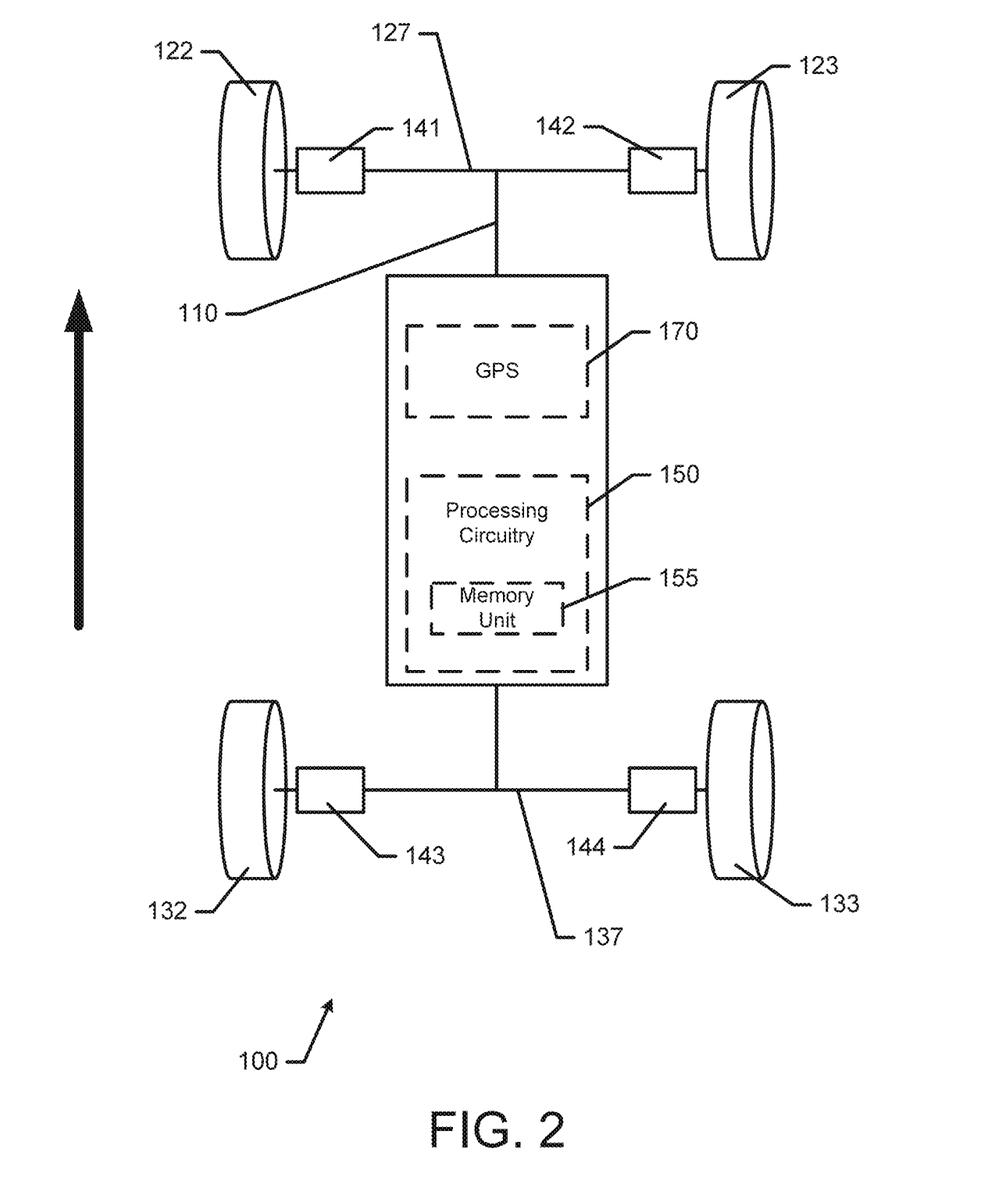
FIG. 2 illustrates a schematic diagram of the tire tread monitoring system of FIG. 1 in accordance with an example embodiment.

FIG. 1 illustrates a block diagram of a tire tread monitoring system 100 of an example embodiment. FIG. 2 illustrates a schematic diagram of the tire tread monitoring system 100 of a vehicle 110 according to an example embodiment. The components of the tire tread monitoring system 100 may be incorporated into the vehicle 110 (e.g., via being operably coupled to a chassis of the vehicle 110, various components of the vehicle 110 and/or electronic control systems of the vehicle 110). Of note, although the components of FIGS. 1 and 2 may be operably coupled to the vehicle 110, it should be appreciated that such connection may be either direct or indirect. Moreover, some of the components of the tire tread monitoring system 100 may be connected to the vehicle 110 via intermediate connections to other components either of the chassis or of other electronic and/or mechanical systems or components.

Referring now to FIGS. 1 and 2, the tire tread monitoring system 100 may include front wheels 120 and rear wheels 130 of the vehicle 110. The front wheels 120 may include a first wheel 122, a second wheel 123 and front tires 124. The front tires 124 may include a first tire 125 and a second tire 126, which may be components of the first wheel 122 and the second wheel 123, respectively. In other words, and as used herein, the term wheel may refer to the other portions of the corresponding wheel including the tire, but the term tire may just refer to the tire and not include the other portions of the corresponding wheel. Each of the front wheels 120 may be operably coupled to a front axle 127 of the vehicle 110. Similarly, the rear wheels 130 may include a third wheel 132, a fourth wheel 133, and rear tires 134. The rear tires 134 may include a third tire 135 and a fourth tire 136, which may be components of the third wheel 132 and the fourth wheel 133, respectively. Each of the rear wheels 130 may be operably coupled to a rear axle 137 of the vehicle 110. In this regard, each of the first tire 125, second tire 126, third tire 135, and fourth tire 136 may wear down at different rates independent of each other based on various environmental or driver dictated factors.

Additionally, the tire tread monitoring system 100 may include a sensor network 140, processing circuitry 150 and a user interface 160. The sensor network 140 may include a plurality of sensors that may collect various forms of data from the vehicle 110. In this regard, the sensor network 140 may include a first wheel speed sensor 141, a second wheel speed sensor 142, a third wheel speed sensor 143 and a fourth wheel speed sensor 144 which may be operably coupled to the first, second, third and fourth wheels (122, 123, 132, 133), respectively. Each wheel speed sensor (141, 142, 143, 144) may collect wheel speed data from its respective wheel (122, 123, 132, 133) and may accordingly transmit the wheel speed data to the processing circuitry 150. In this regard, the wheel speed data collected by the wheel speed sensors (141, 142, 143, 144) may include information to be used by the processing circuitry 150 to determine a rolling radius of each of the first, second, third and fourth tires (125, 126, 135, 136) as the vehicle 110 is driving. For example, the processing circuitry 150 may use the rotational velocity of the respective wheel (122, 123, 132, 133) to which the wheel speed sensor (141, 142, 143, 144) is operably coupled to determine a number of rotations the respective wheel (122, 123, 132, 133) makes in a specified distance that the vehicle 110 may travel, in order to ultimately determine the rolling radius of each tire (125, 126, 135, 136). Such sensors that are part of the sensor network 140 may be operably coupled to the tire tread monitoring system 100 (and/or the components or subassemblies) via a vehicle communication bus (e.g., a controller area network (CAN) bus).

A typical sensor measures wheel rotation. Typically it generates 60 or 120 digital edges per revolution. While these sensors actually measure rotational displacement, they are referred to as wheel speed sensors. Speed is computed as the time derivative of angular displacement, as angular displacement is the natural output of such sensors. When wheel speed data (or a number of rotations of the wheel per unit of time) is used to determine rolling radius for tires (125, 126, 135, 136), the wheel speed data may be referred to as rolling radius data. However, rolling radius may be determined in alternative ways as well. In those alternative ways, various ones of which may rely on other parameters than wheel speed data may define or be included in the rolling radius data.

For other purposes, it may be useful to determine rolling radii relative to an absolute (e.g. GPS) but for computing front-to-rear tire wear, it is enough to compute relative rolling radii (or a mathematically measure of similar efficacy).

As mentioned previously, the rolling radii ratio front to back may be nominally something other than 1.0000. Primarily, this is a function of axle loading ratio (front-to-back) and axle torque ratio (front-to-back). The nominal ratio can be determined a priori on unworn tires as a function of these measurables.

In an example embodiment, the sensor network 140 may constantly, routinely, periodically or selectively collect rolling radius data from the front wheels 120 and the rear wheels 130, but the processing circuitry 150 may only decide to use certain sets of previously recorded rolling radius data to determine the rolling radius of each tire (125, 126, 135, 136). In this regard, the processing circuitry 150 may include a memory unit 155 where the rolling radius data from the sensor network 140 may be stored until the processing circuitry 150 determines which sets of the rolling radius data may be best to use for determining the rolling radius of each tire (125, 126, 135, 136). Whenever drive torque is applied to the front wheels 120 or rear wheels 130, the corresponding driven wheels will experience some amount of slip. Slip may also be experienced when steering or cornering, when going uphill or downhill, increasing speed, and braking. The occurrence of slip may complicate or frustrate accurate rolling radius determinations. Thus, it may be advantageous to measure rolling radius data at times when either no slip is experienced, when reduced slip is experienced, or when slip is reliably characterized. Accordingly, in some embodiments, a selected or preferred set of rolling radius data may be recorded while the vehicle 110 may be coasting or otherwise does not have any input from a throttle of the vehicle 110. In an example embodiment, a selected or preferred set of rolling radius data may be recorded while the vehicle 110 may be driving with a cruise control feature engaged to hold the vehicle 110 speed constant. In some cases, a selected or preferred set of rolling radius data may be recorded while the vehicle 110 may be driving along a straight section of road. Combinations of these situations may also be preferred or selected in some cases.

In some embodiments, the processing circuitry 150 of the tire tread monitoring system 100 may be configured (e.g., programmed) to determine the rolling radius of each of the first, second, third and fourth tires (125, 126, 135, 136) using a selected (or preferred) set of rolling radius data. The selected or preferred set of rolling radius data may be selected from a plurality of candidate recorded data segments in some cases. In these cases, the candidate recorded data segments may be recorded without regard to their potential usefulness, and the processing circuitry 150 may perform an ad hoc determination of whether the candidate recorded data segments were recorded during advantageous times for minimizing slip (e.g., when coasting, using cruise control, not turning and/or not going up or down hill). Alternatively or additionally, the processing circuitry 150 may record the candidate recorded data segments when it is expected (e.g., based on vehicle routing or knowledge of the road ahead) that an upcoming period of time will be a good candidate recorded segment.

Additionally, the processing circuitry 150 may be configured to determine a difference in the rolling radius between the front tires 124 and the rear tires 134. In this regard, in some embodiments, the processing circuitry 150 may take an average rolling radius for the front tires 124 and an average rolling radius for the rear tires 134 and take the difference between the two averages. In some cases, the processing circuitry 150 may determine the rolling radius of each tire (125, 126, 135, 136) and take the difference between the first tire 125 and the third tire 135 or the difference between the first tire 125 and the fourth tire 136 (first tire minus third tire or first tire minus fourth tire). In some other cases, the processing circuitry 150 may determine the rolling radius of each tire (125, 126, 135, 136) and take the difference between the second tire 126 and the third tire 135 or the difference between the second tire 126 and the fourth tire 136 (second tire minus third tire or second tire minus fourth tire). In any case, the processing circuitry 150 may determine the difference in the rolling radii of one or more of the front tires 124 and the rear tires 134.

Furthermore, the processing circuitry 150 may compare the determined difference in rolling radii between the front tires 124 and the rear tires 134 to a predetermined threshold value that may be stored in the memory unit 155. In this regard, the processing circuitry 150 may determine the severity of the difference in rolling radii between the front tires 124 and the rear tires 134. In an example embodiment, the predetermined threshold value may be on the order of 2 mm or 3 mm. However, larger or smaller predetermined threshold values may be used in some cases. In any case, the processing circuitry 150 may compare the difference between the rolling radii of the front tires 124 and the rear tires 134 to the predetermined threshold value, and responsive to the determined difference exceeding the predetermined threshold value, the processing circuitry 150 may generate a notification on the user interface 160 to indicate to an operator 165 that a tire rotation service is recommended for the vehicle 110.

In some embodiments, the tire tread monitoring system 100 may further include a global positioning system (GPS) 170. The GPS 170 may be utilized to gather further data for the processing circuitry 150 to use in determining the rolling radii of the front tires 124 and the rear tires 134. For instance, the GPS 170 may be configured such that the processing circuitry 150 may use data from the GPS 170 to record the distance driven by the vehicle 110. In this regard, the processing circuitry 150 may determine the rolling radius of each tire (125, 126, 135, 136) by dividing a distance traveled by the vehicle 110 over a straight section of road by the number of rotations that each wheel (122, 123, 132, 133) completed in the specified distance traveled. In an example embodiment, the GPS 170 may also be used by the tire tread monitoring system 100 to predict when the vehicle 110 may drive along a straight section of road. In this regard, the tire tread monitoring system 100 may preemptively determine that the rolling radius data recorded along an upcoming straight section of road will be used by the processing circuitry 150 to determine the rolling radii of the front tires 124 and the rear tires 134 and thus the difference therebetween. In some embodiments, a preferred set of rolling radius data may be recorded while the vehicle 110 may be coasting or otherwise does not have any input from the throttle of the vehicle 110. In an example embodiment, a preferred set of rolling radius data may be recorded while the vehicle 110 may be driving with a cruise control feature engaged to hold the vehicle 110 speed constant. FIG. 2 also depicts a schematic overview of the first wheel speed sensor 141, the second wheel speed sensor 142, the third wheel speed sensor 143 and the fourth wheel speed sensor 144, which may be operably coupled to the first, second, third and fourth wheels (122, 123, 132, 133), respectively. As mentioned previously as well, the first wheel 122 and the second wheel 123 may be operably coupled to the front axle 127 of the vehicle 110, and the third wheel 132 and the fourth wheel 133 may be operably coupled to the rear axle 137. In this regard, in some cases, the processing circuitry 150 may take the ratio of wheel speeds between the front axle 127 and the rear axle 137 when determining the rolling radii of the front wheels 120 and the rear wheels 130, and thus the difference therebetween.

Since tire pressure influences rolling radius, ideally all the tires would be at their nominal design values at testing. But if they are not, it would still be desirable to be able to conduct the front-to-rear tire wear evaluation. To support this, an a priori determination of the effect of tire pressure on rolling radius may be made, and a correction of the measured radius to what it would be if the tire was inflated to the design level may be made.

Figure 3A:
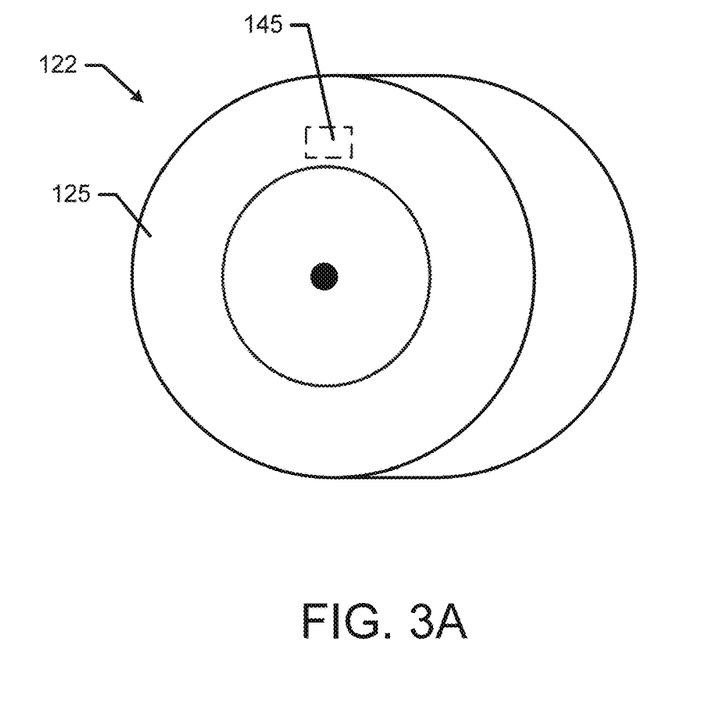
FIG. 3A illustrates a wheel with a tire pressure sensor of the sensor network according to an example embodiment.
Figure 3B:
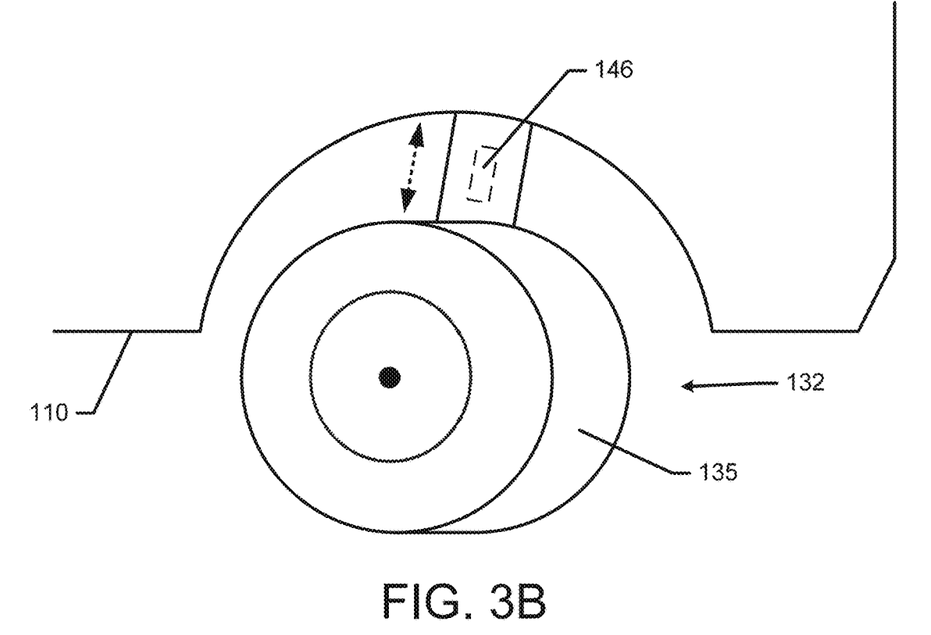
FIG. 3B illustrates a vehicle with a ride height sensor of the sensor network according to an example embodiment.

FIGS. 3A and 3B depict further components of the tire tread monitoring system 100 according to further example embodiments. In some embodiments, the processing circuitry 150 may account for the road conditions when determining the rolling radii of the front tires 124 and the rear tires 134. In this regard, the sensor network 140 may further comprise noise, vibration, and harshness (NVH) sensors that may be configured to gather data on the state of the surface of the road based on vibration feedback throughout the vehicle 110. In some other cases, the processing circuitry 150 may normalize the rolling radii of the front tires 124 and the rear tires 134 for variations in air pressure within the tires (125, 126, 135, 136). In this regard, a tire pressure sensor 145 may be disposed in each tire (125, 126, 135, 136) as part of the sensor network 140. The tire pressure sensor 145 may record the air pressure inside of each tire (125, 126, 135, 136) and may report the air pressure to the processing circuitry 150. The processing circuitry 150 may use the air pressure in each tire (125, 126, 135, 136) to determine a scaling factor to apply to the rolling radius value of each tire (125, 126, 135, 136) due to each tire (125, 126, 135, 136) potentially being underinflated or overinflated relative to a nominal tire pressure value.

The ride height sensors measure vehicle loading via suspension displacement. Since this affects rolling radius, it too can be corrected to the design loading level for the vehicle. This allows the front-to-back rolling radius ratio computation to be valid even when the loading is not at the nominal or design levels. The processing circuitry 150 may similarly normalize the rolling radii of the front tires 124 and the rear tires 134 for variations in the loading of the vehicle 110. As shown in FIG. 3B, ride height sensors 146 may be disposed on the vehicle 110. In this regard, a ride height sensor 146 may be disposed in suspension components of the vehicle 110 as part of the sensor network 140. The ride height sensor 146 may record a displacement of suspension components of the vehicle 110 relative to a nominal displacement between the suspension components of the vehicle 110 without loading. The processing circuitry 150 may use the vehicle 110 loading data from the ride height sensors 146 to determine a scaling factor to apply to the rolling radius value of each tire (125, 126, 135, 136) since each tire (125, 126, 135, 136) may potentially be supporting a greater gross vehicle weight.

In some cases, the processing circuitry 150 may similarly normalize the rolling radii of the front tires 124 and the rear tires 134 for wheel slip. In this regard, the wheel speed sensors (141, 142, 143, 144) may detect when the respective wheel (122, 123, 132, 133) that the sensor is operably coupled to slips and rotates more relative to the other wheels (122, 123, 132, 133) of the vehicle 110. For instance, if the first wheel 122 slips and rotates more or less than the second, third and fourth wheels (123, 132, 133), then the first wheel speed sensor 141 may detect that slip and transmit it to the processing circuitry 150 accordingly. The processing circuitry 150 may use the wheel slip data from the wheel speed sensors (141, 142, 143, 144) to determine a scaling factor to apply to the rolling radius value of each tire (125, 126, 135, 136) from a look-up table stored in the memory unit 155. In addition to local storage for each vehicle in the memory unit 155, vehicles may be enabled to communicate data locally recorded to the cloud, or to an external database. The external database may be used by the manufacturer or fleet managers to make determinations regarding algorithm updates or the like, which may then be pushed back to the individual vehicles.

Thus, it should be apparent that for some complicating factors like tire pressure and vehicle loading, a correction of the computed front-to-back rolling radius ratio and for other complicated factors like braking above a threshold, increasing velocity above a threshold, gravel roads, low coefficient of friction (low mu) roads, turning, hill climb/descent, axle rotation locked together (as selectable in some 4WD systems) may be accomplished. Moreover, in some cases, an evaluation of the complicating factors may cause a suspension of rolling radius determinations when the complicating factors reach a level that may lead to an unreliable assessment.

It is also noteworthy that many vehicles now have electric axles on both front and rear. It is possible to set the torque distribution front-to-rear independently. Thus it may be desirable to set the front-to-rear torque ratio near 1.0 for an unbiased measure of front-to-rear tread wear. Alternately, the torque ratio could be set to match the axle loading ratio front-to-back.

In this regard, it may be desirable to get an unbiased measure of front-to-rear tire wear. The unbiased measure may be accomplished by compensating for measured factors (e.g. tire pressure, vehicle loading), controlling factors (e.g. torque ratio), and blocking out adverse conditions (e.g. steering angle, lateral rate of change of velocity, etc.).

Figure 4:
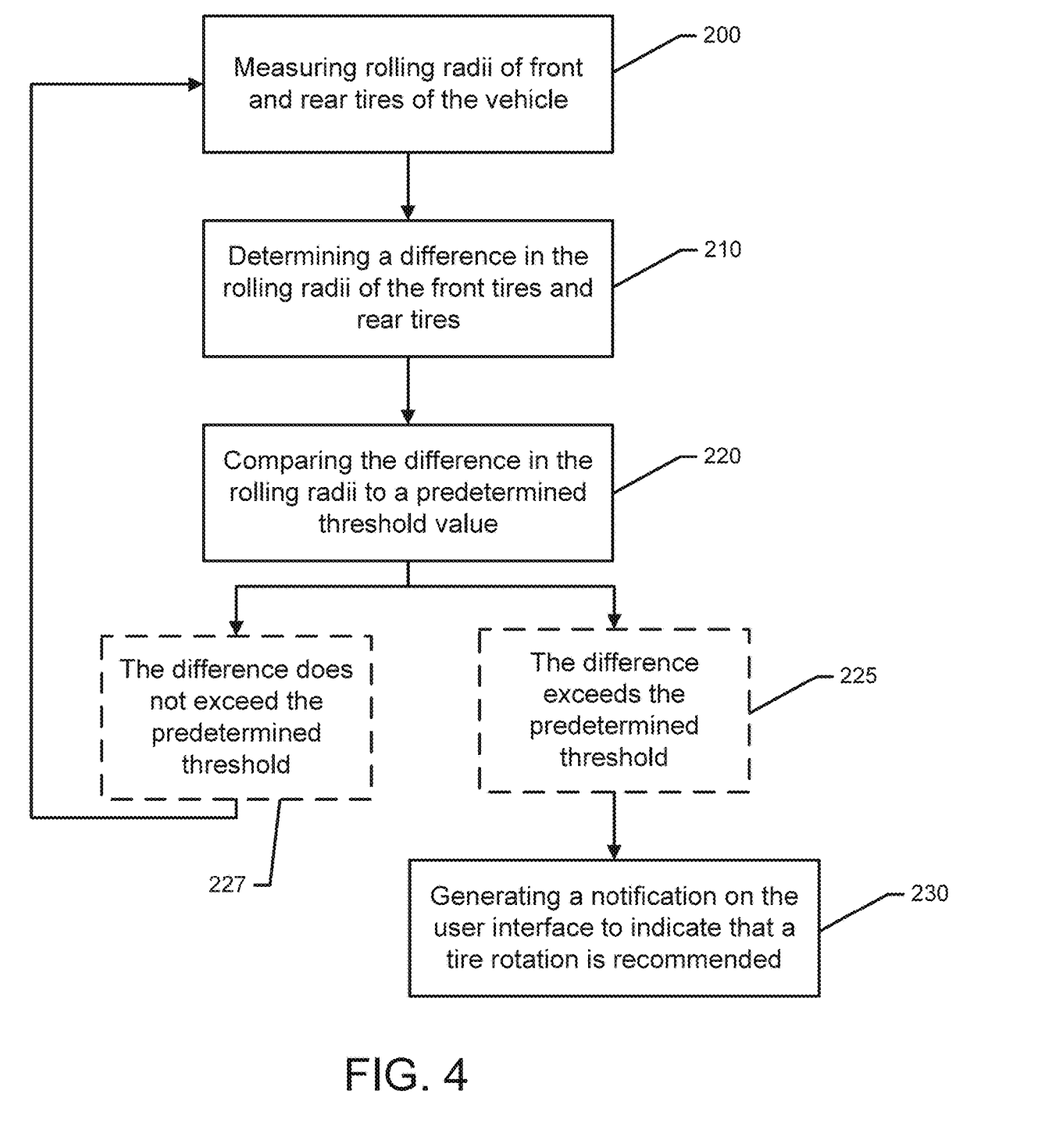
FIG. 4 illustrates a block diagram of a method of monitoring tire tread and recommending a tire rotation according to an example embodiment.

FIG. 4 is an example of a flowchart of a method according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart of FIG. 4 support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions. The method of FIG. 4 may include measuring the rolling radii of the front and rear tires (124, 134) of the vehicle 110 at operation 200. The method may further include determining a difference in the rolling radii of the front tires 124 and rear tires 134 at operation 210. As noted above, this difference may in some cases be represented by a ratio instead of a subtraction of values. The method may also include comparing the difference in the rolling radii to a predetermined threshold value at operation 220. The result of the comparison in operation 220 may yield one of two different outcomes: the difference may exceed the predetermined threshold value as set forth by condition 225, or the difference may not exceed the predetermined threshold value as set forth by condition 227. If condition 225 is met, then the method may further include generating a notification on the user interface 160 to indicate that a tire rotation is recommended at operation 230. If condition 227 is met, then the method may start over with operation 200.

Surprisingly, it does not matter if it is the front or rear that is wearing more. Either case has the same prescription, rotate the tires front-to-back. However, retaining information on tire history, and in particular, retaining the rolling radius data for each tire at the beginning of a given tire rotation period, is important. In this regard, if one loses the history of the rolling radius data for tires in each tire position, immediately after rotating the tires, a rotation would then again be prescribed (since the difference in rolling radius that triggered the change is still in existence immediately after the change in tire positions). Thus, action must be taken to prevent this. In an example embodiment, it may be possible to track either each tire's miles in position or to know that, on a certain vehicle, the front or the rear axle wears faster. This is generally known for any given vehicle model. Thus, tire rotation may only be recommended if it results in the least worn tires being moved to the fastest wearing axle location (front or rear). To support this, the system 100 may have an ability to track the wheel position on the car (LF, RF, RR, LR) via the tire pressure monitoring system (TPMS). Thus, for example, miles that each wheel spends in each vehicle position may be tracked, and tire rotations at each position may also be tracked.

In an example embodiment, the processing circuitry 150 may sense and record average TPMS serial number's wheel position (averaged over 100 miles). And record the axles' rolling radius over the same period. In this way, data that can be mined for the rotation pattern, miles in that rotation pattern, and the rolling radius for a 100 mile period may be obtained. From this it may be possible to determine wear rate, front relative to rear, and to know how the tire is to be rotated even if the last wheel corner position is lost. When corresponding wheels are reattached to the vehicle, the TMPS (after a few miles) may be able to determine which wheel went where. Thus, the TPMS may know the proper rotation action to take, if any.

In an example embodiment, the tire tread monitoring system 100 for performing the method of FIG. 4 above may comprise processing circuitry 150 configured to perform some or each of the operations (200-230) described above. The processing circuitry 150 may, for example, be configured to perform the operations (200-230) by performing hardware implemented logical functions, executing stored instructions, or executing algorithms for performing each of the operations. In some embodiments, the processor or processing circuitry may be further configured for the additional operations or optional modifications to operations 200-230 that are discussed below.

A system for monitoring tire tread on a vehicle may therefore be provided. The system may include front wheels which may include front tires, rear wheels which may include rear tires, a sensor network which may be operably coupled to one or more of the front tires and one or more of the rear tires to determine rolling radius data associated with the front tires and the rear tires, processing circuitry which may include a memory unit and may be configured to receive the rolling radius data from the sensor network, and a user interface which may display information to an operator of the vehicle. The processing circuitry may be further configured to determine a rolling radius of the front tires and the rear tires based on the rolling radius data, determine a difference in the rolling radius between the front tires and the rear tires, compare the difference in the rolling radius to a predetermined threshold value, and generate a notification via the user interface to indicate that a tire rotation may be recommended responsive to the difference in the rolling radius exceeding the predetermined threshold value.

A rolling radius difference or ratio may be used to characterize the difference in tire wear front-to-rear.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the front tires may include a first tire and a second tire associated with a first wheel and a second wheel, respectively, of the front wheels, and the rear tires may include a third tire and a fourth tire associated with a third wheel and a fourth wheel, respectively, of the rear wheels. In an example embodiment, the sensor network may include a first wheel speed sensor, a second wheel speed sensor, a third wheel speed sensor, and a fourth wheel speed sensor, which may be operably coupled to respective ones of the first, second, third and fourth wheels, respectively. In some cases, the first, second, third and fourth wheel speed sensors may provide corresponding wheel speed data to the processing circuitry as the rolling radius data associated with the front tires and the rear tires, respectively. In an example embodiment, determining the rolling radius of the front and rear tires may include dividing a distance traveled by a number of rotations that each respective one of the first, second, third and fourth wheels may have completed in the distance traveled. In some cases, determining the rolling radius may be performed based on wheel speed data recorded in the memory unit while the vehicle may be driving. In an example embodiment, the processing circuitry may select previously recorded wheel speed data and may determine the difference in the rolling radii between the front tires and the rear tires. In some cases, the wheel speed data may be selected based on sections of road over which the vehicle may have coasted, may not have turned, or may have operated in cruise control. In an example embodiment, the system may further include a global positioning system (GPS) which may predict when the vehicle may drive on a straight section of road. In some cases, the processing circuitry may use the rolling radius data recorded in the memory unit on the straight section of road to determine the difference in the rolling radius between the front tires and the rear tires. In an example embodiment, the rolling radius of each of the front and rear tires may be normalized for variations in tire pressure using data from a tire pressure sensor which may be disposed in each tire of the front and rear tires. In some cases, the rolling radius of the front tires and the rear tires may be normalized for vehicle loading using ride height data from ride height sensors of the sensor network. In an example embodiment, the system may be configured to detect wheel slip, and the rolling radius of the front tires and the rear tires may be normalized for wheel slip using a look-up table which may be stored in the memory unit. In some cases, the predetermined threshold value may be about 2 mm or 3 mm.

Example embodiments may therefore enable a method of using GPS and map knowledge to know the road characteristics (uphill, downhill, curve, concrete, asphalt, gravel, high speed, stop and go, limited access) for consideration in relation to suggesting tire rotation. Weather data may offer similar knowledge of possible coefficient of friction info, which may augment the method. Beyond GPS, mapping, and weather, sensing of road condition may also be possible with various sensors. In this regard, rate of change of velocity sensors and IMU (inertial) sensors may indicate road curve, elevation gain, surface smoothness, etc.

A method of monitoring tire tread on a vehicle may be provided. The method may include determining a rolling radius of front tires and rear tires of the vehicle based on rolling radius data, determining a difference in the rolling radius of the front tires and the rear tires, comparing the difference in the rolling radius to a predetermined threshold value, and generating a notification on a user interface to indicate that a tire rotation may be recommended responsive to the difference in the rolling radius exceeding the predetermined threshold value.

The method (or apparatus configure to perform the method) of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the front tires may include a first tire and a second tire associated with a first wheel and a second wheel, respectively, and the rear tires may include a third tire and a fourth tire associated with a third wheel and a fourth wheel, respectively. In an example embodiment, determining the rolling radius of the front tires and the rear tires may include gathering the rolling radius data from a sensor network. In some cases, the sensor network may include a first wheel speed sensor, a second wheel speed sensor, a third wheel speed sensor, and a fourth wheel speed sensor, which may be operably coupled to respective ones of the first, second, third and fourth wheels, respectively. In an example embodiment, the vehicle may further include processing circuitry which may include a memory unit and may be configured to receive the rolling radius data from the sensor network. In some cases, the first, second, third and fourth wheel speed sensors may provide corresponding wheel speed data to the processing circuitry as the rolling radius data associated with the front tires and the rear tires, respectively. In an example embodiment, determining the rolling radius of the front and rear tires may include dividing a distance traveled by a number of rotations that each respective one of the first, second, third and fourth wheels may have completed in the distance traveled. In some cases, determining the difference in the rolling radius of the front tires and the rear tires may include taking the difference between an average rolling radius of the front tires and an average rolling radius of the rear tires, or may include taking individual differences in the rolling radii of the first, second, third and fourth tires. In an example embodiment, the vehicle may include a global positioning system (GPS) to predict when the vehicle will be driving on a straight section of road. In some cases, the processing circuitry may uses the rolling radius data recorded on the straight section of road to determine the difference in the rolling radius between the front tires and the front tires. In an example embodiment, determining the rolling radius may be performed based on wheel speed data recorded in the memory unit while the vehicle may be driving. In some cases, the processing circuitry may select previously recorded wheel speed data from the memory unit to determine the difference in the rolling radii between the front tires and the rear tires. In an example embodiment, the wheel speed data may be selected based on sections of road over which the vehicle may have coasted, may not have turned, or may have operated in cruise control. In some cases, the rolling radius of each of the front and rear tires may be normalized for variations in tire pressure using data from a tire pressure sensor which may be disposed in each tire of the front and rear tires. In an example embodiment, the rolling radius of the front tires and the rear tires may be normalized for vehicle loading using ride height data from ride height sensors of the sensor network. In some cases, the predetermined threshold value may be about 2 mm or 3 mm.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system for monitoring tire tread on a vehicle, the system comprising:
    front wheels comprising front tires;
    rear wheels comprising rear tires;
    a sensor network operably coupled to one or more of the front tires and one or more of the rear tires to determine rolling radius data associated with the front tires and the rear tires;
    processing circuitry comprising a memory unit and configured to receive the rolling radius data from the sensor network; and
    a user interface to display information to an operator of the vehicle,
    wherein the processing circuitry is further configured to:
        determine a rolling radius of the front tires and the rear tires based on the rolling radius data,
        determine a difference in the rolling radius between the front tires and the rear tires,
        compare the difference in the rolling radius to a predetermined threshold value, and
        generate a notification via the user interface to indicate that a tire rotation is recommended responsive to the difference in the rolling radius exceeding the predetermined threshold value,
    wherein the rolling radius of each of the front and rear tires is normalized for variations in tire pressure using data from a tire pressure sensor disposed in each tire of the front and rear tires.

2. The system of claim 1, wherein the front tires include a first tire and a second tire associated with a first wheel and a second wheel, respectively, of the front wheels, and the rear tires include a third tire and a fourth tire associated with a third wheel and a fourth wheel, respectively, of the rear wheels,
    wherein the sensor network comprises a first wheel speed sensor, a second wheel speed sensor, a third wheel speed sensor, and a fourth wheel speed sensor, operably coupled to respective ones of the first, second, third and fourth wheels, respectively, and
    wherein the first, second, third and fourth wheel speed sensors provide corresponding wheel speed data to the processing circuitry as the rolling radius data associated with the front tires and the rear tires, respectively.

3. The system of claim 2, wherein determining the rolling radius of the front and rear tires comprises dividing a distance traveled by a number of rotations that each respective one of the first, second, third and fourth wheels completed in the distance traveled.

4. The system of claim 1, wherein determining the rolling radius is performed based on wheel speed data recorded in the memory unit while the vehicle is driving, and
    wherein the processing circuitry selects previously recorded wheel speed data to determine the difference in the rolling radii between the front tires and the rear tires.

5. The system of claim 4, wherein the wheel speed data is selected based on sections of road over which the vehicle coasted, did not turn, or operated in cruise control.

6. The system of claim 1, further comprising a global positioning system (GPS) to predict when the vehicle will be driving on a straight section of road, and
    wherein the processing circuitry uses the rolling radius data recorded in the memory unit on the straight section of road to determine the difference in the rolling radius between the front tires and the rear tires.

7. The system of claim 1, wherein the rolling radius of the front tires and the rear tires is normalized for vehicle loading using ride height data from ride height sensors of the sensor network.

8. The system of claim 1, wherein the predetermined threshold value is about 2 mm or 3 mm.

9. A method of monitoring tire tread on a vehicle, the method comprising:
   determining a rolling radius of front tires and rear tires of the vehicle based on rolling radius data;
   determining a difference in the rolling radius of the front tires and the rear tires;
   comparing the difference in the rolling radius to a predetermined threshold value; and
   generating a notification on a user interface to indicate that a tire rotation is recommended responsive to the difference in the rolling radius exceeding the predetermined threshold value,
   wherein the rolling radius of the front tires and the rear tires is normalized for vehicle loading using ride height data from ride height sensors of the sensor network.

10. The method of claim 9, wherein the front tires include a first tire and a second tire associated with a first wheel and a second wheel, respectively, and the rear tires include a third tire and a fourth tire associated with a third wheel and a fourth wheel, respectively,
   wherein determining the rolling radius of the front tires and the rear tires comprises gathering the rolling radius data from a sensor network,
   wherein the sensor network comprises a first wheel speed sensor, a second wheel speed sensor, a third wheel speed sensor, and a fourth wheel speed sensor, operably coupled to respective ones of the first, second, third and fourth wheels, respectively,
   wherein the vehicle further comprises processing circuitry comprising a memory unit and configured to receive the rolling radius data from the sensor network, and
   wherein the first, second, third and fourth wheel speed sensors provide corresponding wheel speed data to the processing circuitry as the rolling radius data associated with the front tires and the rear tires, respectively.

11. The method of claim 10, wherein determining the rolling radius of the front and rear tires comprises dividing a distance traveled by a number of rotations that each respective one of the first, second, third and fourth wheels completed in the distance traveled.

12. The method of claim 11, wherein determining the difference in the rolling radius of the front tires and the rear tires comprises taking the difference between an average rolling radius of the front tires and an average rolling radius of the rear tires, or taking individual differences in the rolling radii of the first, second, third and fourth tires.

13. The method of claim 11, wherein the vehicle comprises a global positioning system (GPS) to predict when the vehicle will be driving on a straight section of road, and wherein the processing circuitry uses the rolling radius data recorded on the straight section of road to determine the difference in the rolling radius between the front tires and the front tires.

14. The method of claim 11, wherein determining the rolling radius is performed based on wheel speed data recorded in the memory unit while the vehicle is driving, and
   wherein the processing circuitry selects previously recorded wheel speed data from the memory unit to determine the difference in the rolling radii between the front tires and the rear tires.

15. The method of claim 14, wherein the wheel speed data is selected based on sections of road over which the vehicle coasted, did not turn, or operated in cruise control.

16. The method of claim 9, wherein the rolling radius of each of the front and rear tires is normalized for variations in tire pressure using data from a tire pressure sensor disposed in each tire of the front and rear tires.

17. A system for monitoring tire tread on a vehicle, the system comprising:
   front wheels comprising front tires;
   rear wheels comprising rear tires;
   a sensor network operably coupled to one or more of the front tires and one or more of the rear tires to determine rolling radius data associated with the front tires and the rear tires;
   processing circuitry comprising a memory unit and configured to receive the rolling radius data from the sensor network; and
   a user interface to display information to an operator of the vehicle,
   wherein the processing circuitry is further configured to:
      determine a rolling radius of the front tires and the rear tires based on the rolling radius data,
      determine a difference in the rolling radius between the front tires and the rear tires,
      compare the difference in the rolling radius to a predetermined threshold value, and
      generate a notification via the user interface to indicate that a tire rotation is recommended responsive to the difference in the rolling radius exceeding the predetermined threshold value,
   wherein the system is configured to detect wheel slip, and
   wherein the rolling radius of the front tires and the rear tires is normalized for wheel slip using a look-up table in the memory unit.

18. The method of claim 9, wherein the predetermined threshold value is about 2 mm or 3 mm.

19. The system of claim 17, wherein the rolling radius of each of the front and rear tires is normalized for variations in tire pressure using data from a tire pressure sensor disposed in each tire of the front and rear tires.

20. The method of claim 17, wherein the rolling radius of the front tires and the rear tires is normalized for vehicle loading using ride height data from ride height sensors of the sensor network.

* * * * *